United States Patent
Hock et al.

(10) Patent No.: US 6,399,170 B1
(45) Date of Patent: *Jun. 4, 2002

(54) PLASTIC CLOSURE WITH COMPRESSION MOLDED BARRIER LINER

(75) Inventors: Mark R. Hock, Toledo; David B. Riffer, Perrysburg, both of OH (US)

(73) Assignee: Owens-Illinois Closure Inc., Toledo, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,871

(22) Filed: Dec. 24, 1997

(51) Int. Cl.[7] .......................... B32B 27/30; B32B 27/32
(52) U.S. Cl. ................ 428/36.6; 215/341; 215/DIG. 2; 428/66.3; 428/66.4; 428/114; 428/516; 525/57
(58) Field of Search .............. 428/35.7, 36.6, 428/36.7, 36.8, 66.3, 66.4; 215/341, 347, 349; 525/57; 524/523

(56) References Cited

U.S. PATENT DOCUMENTS

| | | | |
|---|---|---|---|
| 3,480,170 A | 11/1969 | Evans et al. | 215/43 |
| 3,524,905 A | 8/1970 | Coates | 260/897 |
| 3,716,612 A | 2/1973 | Schrenk et al. | 264/329 |
| 3,857,754 A | 12/1974 | Hirata et al. | 161/227 |
| 3,931,449 A | 1/1976 | Hirata et al. | 428/474 |
| 3,975,463 A | 8/1976 | Hirata et al. | 260/897 B |
| 4,151,924 A | 5/1979 | Jameson | 215/347 |
| 4,254,169 A | 3/1981 | Schroeder | 428/35 |
| 4,254,170 A | 3/1981 | Roullet | 428/36 |
| 4,284,671 A | 8/1981 | Cancio et al. | 428/35 |
| 4,309,465 A | 1/1982 | Kornbaum | 428/35 |
| 4,343,754 A | 8/1982 | Wilde et al. | 264/154 |
| 4,360,120 A | 11/1982 | Samuel et al. | 524/494 |
| 4,368,828 A | 1/1983 | Samuel et al. | 220/81 R |
| 4,407,422 A | 10/1983 | Wilde et al. | 215/246 |
| 4,410,482 A | 10/1983 | Subramanian | 264/515 |
| 4,416,942 A | 11/1983 | DiLucccio | 428/332 |
| 4,444,817 A | 4/1984 | Subramanian | 428/36 |
| 4,462,502 A | 7/1984 | Luenser et al. | 215/329 |
| 4,476,987 A | 10/1984 | Nolan | 215/319 |
| 4,518,336 A | 5/1985 | Alieri | 425/110 |

(List continued on next page.)

FOREIGN PATENT DOCUMENTS

| | | | | |
|---|---|---|---|---|
| EP | 0129309 | 12/1984 | | B65D/53/00 |
| EP | 0142183 | 5/1985 | | B32B/27/08 |
| EP | 0153068 | 8/1985 | | B65D/17/50 |
| EP | 0215671 | 3/1987 | | B65D/17/50 |
| EP | 0219265 | 4/1987 | | B65D/41/04 |
| EP | 0278403 | 8/1988 | | |
| GB | 1112025 | 5/1968 | | B65D/53/00 |
| GB | 2158383 | 11/1985 | | B65D/55/16 |
| GB | 2158423 | 11/1985 | | B65D/55/02 |
| GB | 2180521 | 4/1987 | | B65D/17/50 |
| JP | 62263250 | 11/1987 | | C08L/67/02 |

OTHER PUBLICATIONS

M. R. Kamal et al, Polymer Engineering and Science, v. 35, No. 1, pp. 41–51, Jan. 1995.

*Primary Examiner*—Harold Pyon
*Assistant Examiner*—Sandra M. Nolan (57) ABSTRACT

A plastic closure that includes a cap having a base with a peripheral skirt defining a cap interior and threads on the skirt for securing the closure to a container. A liner is secured to the interior of the cap, preferably by compression molding in situ. The liner consists essentially of a blend of a matrix polymer, a particulate barrier polymer and an compatibilizer. The heat and pressure of compression forms the particles of barrier polymer into platelets that are oriented essentially parallel to the plane of the disk.

16 Claims, 5 Drawing Sheets

U.S. PATENT DOCUMENTS

| | | | |
|---|---|---|---|
| 4,525,134 A | 6/1985 | McHenry | 425/130 |
| 4,533,576 A | 8/1985 | Tanahashi et al. | 428/35 |
| 4,568,529 A | 2/1986 | Leconte | 428/325 |
| 4,578,295 A | 3/1986 | Jabarin | 428/35 |
| 4,658,976 A | 4/1987 | Pohlenz | 215/252 |
| 4,705,708 A | 11/1987 | Briggs et al. | 428/35 |
| 4,984,703 A | 1/1991 | Burzynski | 215/350 |
| 5,003,002 A | 3/1991 | Ofstein | 525/58 |
| 5,045,594 A | 9/1991 | Samuel et al. | 525/57 |
| 5,053,258 A | 10/1991 | Booze et al. | 428/366 |
| 5,064,716 A | 11/1991 | Tien-Hua et al. | 428/336 |
| 5,094,793 A | 3/1992 | Schrenk et al. | 264/171 |
| 5,147,930 A | 9/1992 | La Fleur et al. | 525/57 |
| 5,183,848 A | 2/1993 | Samuel et al. | 525/57 |
| 5,186,991 A * | 2/1993 | Samuel et al. | 428/35.8 |
| 5,202,074 A | 4/1993 | Schrenk et al. | 264/241 |
| 5,306,542 A | 4/1994 | Bayer | 428/192 |
| 5,362,531 A | 11/1994 | Samuel et al. | 428/366 |
| 5,380,479 A | 1/1995 | Schrenk et al. | 264/241 |
| 5,430,098 A | 7/1995 | Samuel et al. | 525/57 |
| 5,451,360 A | 9/1995 | Ingram | 264/268 |
| 5,486,558 A * | 1/1996 | Lee | 524/241 |
| 5,628,950 A | 5/1997 | Schrenk et al. | 264/241 |
| 5,700,412 A * | 12/1997 | Mehra et al. | 264/143 |
| 5,731,053 A | 3/1998 | Kuhn et al. | 428/36.92 |

* cited by examiner

PLASTIC CLOSURE WITH COMPRESSION MOLDED BARRIER LINER

The present invention is directed to plastic container closures for beverage, food, juice, pharmaceutical and like applications, and more particularly to an improved process for providing closures with sealing liners having transmission resistance to gases, water vapor and/or flavorants (flavor scalping).

Reference is made to concurrently filed application Ser. No. 08/998,072 filed Dec. 24, 1997 entitled "Plastic Closure with Compression Molded Sealing/Barrier Liner" and assigned to the assignee hereof.

BACKGROUND AND OBJECTS OF THE INVENTION

It has heretofore been proposed to provide a plastic closure for a container that comprises a plastic cap with an interior liner for sealing engagement with the sealing surface of the container. For example, U.S. Pat. No. 4,984,703 discloses a plastic closure that comprises a cap having a base with a peripheral skirt and threads for securing the cap to a container, and a sealing liner compression molded in situ on the interior of the cap base. The sealing liner comprises a blend of ethylene vinyl acetate (EVA) and a thermoplastic elastomeric material such as olefin or styrene-butadiene-styrene. U.S. Pat. No. 5,451,360 discloses a method and apparatus for compression molding the liners in situ within the caps.

It has also heretofore been proposed to form a barrier liner for a plastic closure in an injection or extrusion molding operation from a blend of a thermoplastic olefin homopolymer or copolymer such as ethyl vinyl acetate (EVA) or thermoplastic elastomer, and a barrier polymer to oxygen and carbon dioxide transmission such as ethyl vinyl alcohol (EVOH). The blend also typically includes a compatiblizer material to promote adhesion between the EVOH particles and the EVA carrier material. In general, particles of the EVOH barrier material force gases that permeate the EVA carrier either to follow a tortuous path around the EVOH particles or permeate through the EVOH polymer, thus slowing the rate of gas transmission. The EVOH particles are generally spheroidally dispersed in the EVA carrier since these materials are not miscible. As a general proposition, the percentage reduction in gas transmission corresponds to the percentage content of EVOH in the blend. The results of this technology to date have not provided high barrier properties at acceptable cost and sealing performance.

It is therefore a general object of the present invention to provide a liner for a plastic closure that combines the functions of a seal for engagement with the container sealing surface and an improved barrier against gas transmission, flavor absorption (flavor scalping) and/or water vapor permeation. Another and more specific object of the present invention is to provide a liner of the described character that is of readily moldable and inexpensive composition. Yet another object of the invention is to provide a liner that satisfies the foregoing objectives and is of clear or translucent construction to permit reading through the liner of printing on the closure. A further object of the present invention is to provide a method of fabricating such a liner, and a plastic closure embodying such a liner.

SUMMARY OF THE INVENTION

In accordance with one aspect of the present invention, there is provided a plastic closure that comprises a cap having a base with a peripheral skirt defining a cap interior and means on the skirt for securing the closure to a container. A liner is secured to the interior of the cap, preferably by compression molding in situ. The liner consists essentially of a blend of a matrix polymer, a barrier material and a compatibilizer. The barrier material is in the form of a discontinuous distributed phase of particles in a continuous matrix phase. It has been found that the heat and pressure of compression molding forms the barrier polymer particles into thin overlapping substantially two-dimensional platelets that are oriented within the matrix polymer essentially parallel to the plane of the liner. Thus, gas that permeates the liner must follow a more tortuous path around the platelets, which greatly increases barrier efficiency.

The "matrix polymer" is a thermoplastic elastomer, a soft olefin polymer, or a combination thereof. A thermoplastic elastomer is a synthetic polymer having the processability of a thermoplastic material and the functional performance and properties of a conventional theremoset rubber. There are six generic classes of thermoplastic elastomer commercially available, including styrenic block copolymers (SBC), polyolefin blends (TPO), elastomeric alloys, thermoplastic polyurethanes (TPU), thermoplastic copolyesters and thermoplastic polyamides. Thermoplastic elastomers are described beginning at page 64 in *Modern Plastics Encyclopedia Handbook,* published by McGraw-Hill, 1994, the disclosure of which is incorporated by reference. Examples of thermoplastic elastomers are styrene block copolymers as manufactured by Shell Chemical under the trademark KRATON. These synthetic polymers consist of three discrete blocks of the linear or A-B-A type: styrene-butadiene-styrene, styrene-isoprene-styrene, and styrene-ethylene/butylene-styrene. An elastomeric alloy is ethylene-propylene-diene terpolymer (EPDM). Another elastomeric alloy consists of compounds of EPDM/PP and butyl rubber/PP as manufactured by Advanced Elastomer Systems under the tradenames SANTOPRENE and TREFSIN and disclosed in U.S. Pat. Nos. 4,130,535, 4,311,628, 4,130,534 and 4,607,074. In general, thermoplastic elastomers are characterized by a Shore A hardness of 45 to 95 and a flexural modulus of 30,000 to 100,000 psi.

Soft olefin polymers are thermoplastic olefins, homopolymers and copolymers which are flexible, elastic with a Shore A hardness of less than about 100. Typical soft olefin polymers are: metallocene made polyethylene, ethylene-propylene rubbers, ethylene copolymers and blends thereof, ethylene copolymers such as ethylene vinyl acetate, ethylene methyl acrylate copolymers and ionomers, and combinations thereof. Examples of soft olefin polymers are alpha olefin substituted polyethylenes manufactured using single site catalyst technology (these materials are known in the art as metallocene made polyethylenes); ethylene vinyl acetate (EVA) such as manufactured by DuPont under the trademark ELVAX; polypropylene made with single site catalyst technology known in the art as metallocene made polypropylenes; syndiotactic polypropylenes as marketed by Fina Oil and Chemical; ethylene/propylene copolymers and styrene-ethylene interpolymers as marketed by Dow Chemical; and ionomers such as DuPont's SURLYN product line.

The matrix polymer is typically compounded with antioxidants, lubricants and other stabilizing materials, as known in the art.

A "compatibilizer" is a thermoplastic that ties two other thermoplastics together by a reactive (covalent or dipole—dipole) bond or a non-reactive (chain entanglement) means. Examples include maleic anhydride grafted polymers or ethylene vinyl acetate grafted polymers such as Quantum Chemical's PLEXAR (trademark), Mitsui Petrochemical's ADMER (trademark) and DuPont's BYNEL (trademark) product lines, ethylene methyl acrylate, and ionomers.

A "barrier material" is a thermoplastic material that has a low gas and/or water vapor transmission rate, and presents a high barrier to odorants and essential oils. The following materials have gas transmission rates lower than EVA, which is an industry standard liner material: EVOH (ethylene vinyl alcohol) such as Nippon Goshei's SOARNOL product line and Evalca's EVAL (trademark) product line, nylons such as Dupont's SELAR (trademark) PA, EMS's G21 and Mitsubishi Gas' MXD6 product lines, British Petroleum's BAREX (trademark) acrylonitrile product line, blends of EVOH and amorphous nylon, blends of EVOH and an ionomer such as SURLYN (DuPont), and cyclic olefin copolymers such as marketed by Ticona. Other suitable barrier materials and blends are disclosed in U.S. Pat. Nos. 4,977,004 and 5,064,716, disclosures of which are incorporated herein by reference.

It is currently preferred that the liner also include an additive for reducing the coefficient of friction between the liner and the sealing surface of the container. In the art these additives are called "lubricants." Typical additive lubricants include fatty acid amides, and fatty acid esters, microcrystalline waxes and polyethylene glycols. A preferred lubricant is a low molecular weight fatty acid amide material that blooms to the exposed surface of the polymer material upon cooling from the melt state, thereby reducing the coefficient of friction between the liner and the container sealing surface. Examples are: primary amides with the general chemical structure R—CO—NH2, where R is an alkyl group; secondary amides with the general chemical structure R—CO—NH—R'; where R, R' are alkyl groups; secondary bis-amides with the general chemical structure R—CO—NH-A-NH—CO—R, where R, R' are alkyl groups and A is an Y alkylene group; and blends of the above materials such as in U.S. Pat. No. 5,306,542. The lubricant preferably comprises about 0.5% to 2.0% of the total liner composition by weight, most preferably about 1% by weight. The lubricant is preferably compounded into thermoplastic elastomer material (along with any desired colorants) by the material manufacturer. The amount of lubricant and/or colorant is not included in the calculations of compositions in this application.

In the currently preferred blends of matrix polymer, barrier material and compatibilizer, the barrier material is in the range of about 20% and 60% by weight, the compatibilizer in the range of about 1% to 10% by weight, and the balance consists essentially of the matrix polymer (with lubricant). The relative component percentages will vary with applications, and will depend upon hardness and therefore sealability, the ability of the barrier material to form platelets in the matrix polymer, and the desired removal torque. As to hardness, it has been found that a liner hardness higher than about 94 to 95 Shore (A) is too hard for proper sealing with the container. When employing an elastomer that is relatively hard, such as EVA, the upper limit of the barrier material may be relatively low, such as 35% EVOH. However, when employing a matrix polymer of relatively low hardness, such as thermoplastic elastomer, the upper limit of the barrier material may be much higher, such as 50% to 60% EVOH.

It has also been found that the amount of barrier material that can be included in the blend also depends in part upon polarity of the matrix polymer. Miscibility of the barrier material in the matrix material decreases with decreasing polarity of the matrix material, which means that higher percentages of barrier material can be blended with matrix polymers of lower polarity while still maintaining a discontinuous barrier platelet phase. The amount of compatibilizer also affects the ability of the barrier material to form platelets. Above about 10% compatibilizer, the barrier material becomes to well mixed with the matrix polymer to form the platelets that characterize the invention. Below about 1%, the liner does not exhibit good mechanical properties and does not bond properly with the closure shell.

In accordance with another aspect of the present invention, there is therefore provided a method for making a liner for a plastic closure that comprises the steps of forming a pellet that consists essentially of a blend of a thermoplastic elastomer, a polymer having high barrier properties and a compatibilizer to promote adhesion between the elastomer and the barrier polymer and between the liner and the closure shell. The pellet is then compression molded, preferably within a closure shell, to form a liner disk bonded to the closure shell, and within which the heat and pressure from compression molding forms the barrier polymer into platelets that are oriented essentially parallel to the plane of the disk. The resulting liner exhibits greatly lowered gas transmission rate as compared with a liner formed of a similar blend in other than a compression molding operation.

In accordance with a third aspect of the invention, there is provided a sealing liner for a plastic closure that comprises a disk that consists essentially of a matrix polymer within which a dispersion of platelets of a barrier material to gas transmission are disposed essentially in planes parallel to the disk. The sealing liner preferably is compression molded in situ within a plastic closure from a compression mold charge or pellet in which the matrix polymer, the barrier material and a compatibilizer are blended such that the barrier material consists of discrete particles that are flattened into platelets during the compression molding operation.

BRIEF DESCRIPTION OF THE DRAWINGS

The invention, together with additional objects, features and advantages of thereof, will be best understood from the following description, the appended claims and the accompanying drawings in which:

DETAILED DESCRIPTION OF PREFERRED EMBODIMENTS

Figure 1:
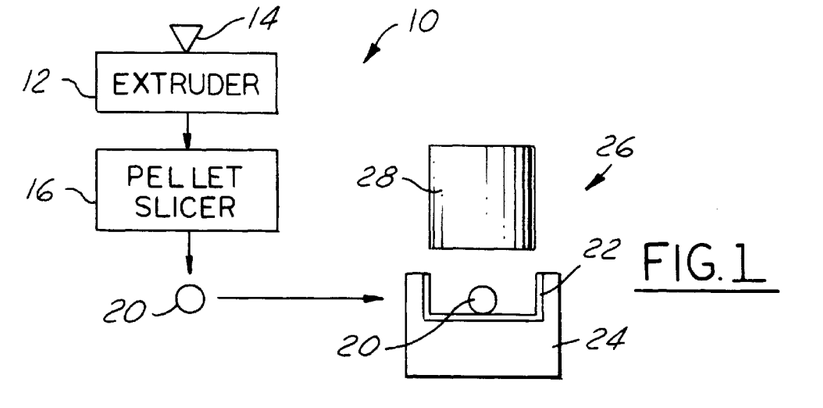
FIG. 1 is a schematic diagram that illustrates compression molding of barrier liners in a plastic closure in accordance with a presently preferred implementation of the invention.
Figure 2:
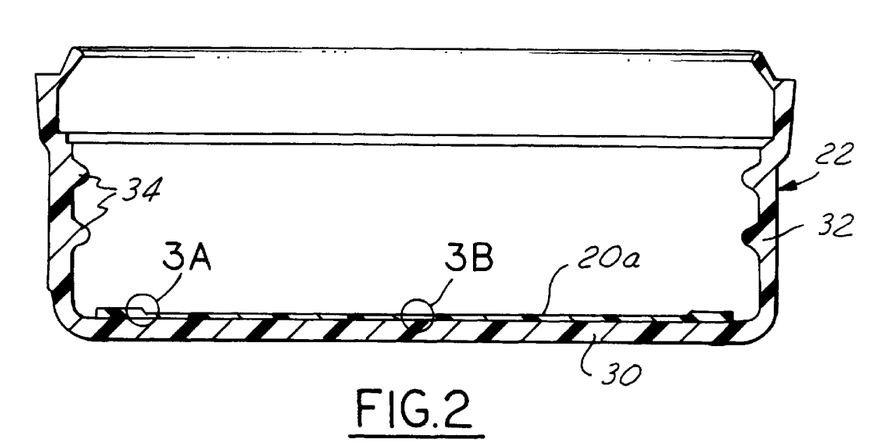
FIG. 2 is a diametrically sectioned elevational view of a plastic closure with integral barrier liner manufactured in accordance with the process schematically illustrated in FIG. 1.
Figure 6:
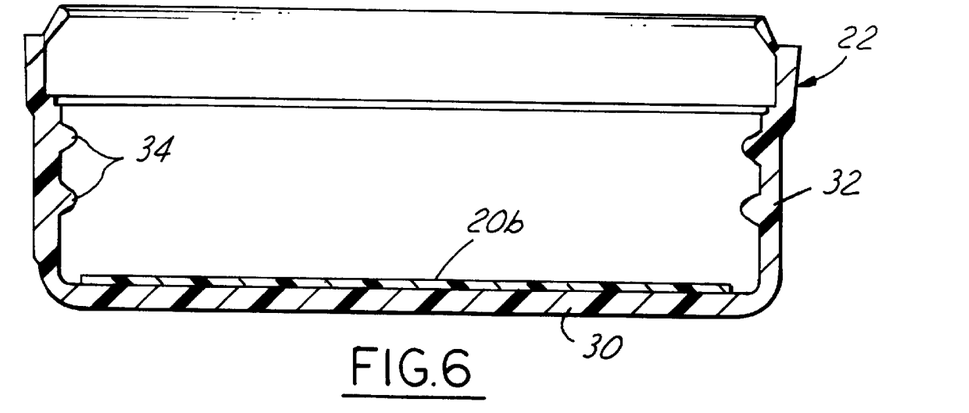
FIGS. 6 and 7 are views similar to that of FIG. 2 but showing modified liner geometries.
Figure 7:
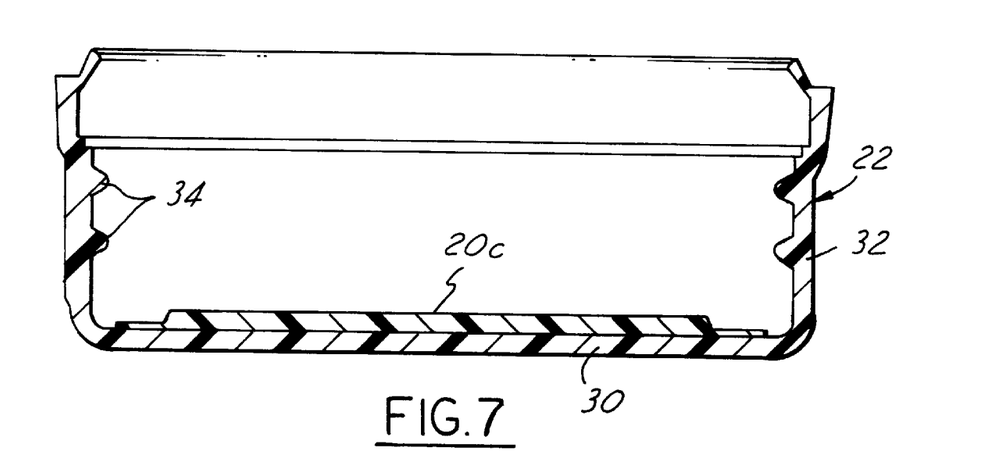

FIG. 1 is a schematic diagram of a process 10 for manufacture of plastic closures in accordance with the present invention. An extruder 12 has a hopper 14 for receiving starting materials. The output of extruder 12 is fed to a pellet slicer 16 from which individual charge pellets 20 are provided. Charge pellet 20 is placed within a prefabricated plastic closure cap 22 in the female die 24 of a compression mold 26. A male die section 28 is closed against pellet 20, cap 22 and die 24 so as to compression mold pellet 20 into a liner that is welded or bonded to the interior surface of the cap base. That is, referring to FIG. 2, the charge pellet is compression molded in situ against the base 30 of cap 22 so as to form a liner 20a. This may be accomplished by hand, or more preferably with the machine disclosed in the above-noted U.S. Pat. No. 5,451,360. Cap 22 also includes a skirt 32 that axially extends from the periphery of base 30, having internal threads 34 for securing cap 22 to a container. Alternatively, pellet 20 may be separately compression molded to form liner 20a, which may then be adhesively secured within cap 22 against base 30. Such an operation requires additional steps and expense, and is therefore not preferred. As a second alternative, the liners may be formed in the closures as disclosed in U.S. Pat. No. 4,518,336. See also U.S. Pat. Nos. 3,674,393, 3,702, 148, 3,877,497 and 4,518,336. FIG. 6 illustrates an alternative liner 20b having a flat geometry, as opposed to the liner 20a of FIG. 3 having a thickened periphery. FIG. 7 illustrates a liner 20c having a flat periphery and a thickened mid section for holding additional barrier material.

For manufacture of plastic closure barrier liners in accordance with the presently preferred implementation of the invention, the input to extruder 12 at hopper 14 preferably consists essentially of one or more barrier polymers, one or more matrix polymers (preferably preblended with lubricant and any desired colorants), and one or more compatibilizer materials. The input materials are mixed and blended in hopper 14. The barrier polymer input preferably is selected from the group consisting of EVOH, nylon, acrylonitrile copolymers such as styrene acrylonitrile and acrylonitrile methylacrylate, blends of EVOH and amorphous nylon, blends of EVOH and an ionomer, acrylonitrile, cyclic olefin copolymers, and blends thereof. The matrix polymer input to hopper 14 preferably is selected from the group consisting of EVA, ethylene/propylene copolymers, styrene block copolymers, terpolymers, ionomers, thermoplastic rubbers, styrene/ethylene/butadiene/styrene block copolymers, styrene/ethylene/butadiene/styrene compounds, styrene/butadiene/styrene block copolymers, EPDM, metallocene linear low polyethylene, metallocene syndiotatic polypropylene, rubbers such as butyl rubber, styrene copolymers such as styrene/ethylene and terpolymers such as styrene/ethylene/butylene, polypropylene/butyl rubber, and blends thereof. The compatibilizer input to hopper 14 preferably is selected from the group consisting of maleic anhydride grafted polymers, ethylene vinyl acetate grafted polymers, EVA, ethylene methyl acrylate, ionomers and blends thereof. As noted above, a lubricant selected from the group consisting of primary amides, secondary amides, secondary bis-amides and blends thereof, preferably is preblended with the matrix polymer.

In the current invention, the liner material consists of a heterogeneous blend of a matrix polymer (TPE or soft olefin) and a condensation polymer or barrier polymer, a compatibilizer and appropriate lubricant. In the disclosed examples of the invention, the matrix polymer is ethylene vinyl acetate (EVA) marketed under the trademark ELVAC 650 by Dupont), the barrier polymer is ethylene vinyl alcohol (EVOH marketed under the trade designation E105B by Evalca), and the compatibilizer is a maleic anhydride grafted polypropylene (ADMER QF551) with 0.5% by weight erucamide+0.5% ethylene bis-oleamide as the lubricant. Although it is not required, it is preferred that all the components of the liner be used in particulate form and the components mixed as particulates prior to extrusion. The particles should as a general rule, be of a size such that the molten blend of incompatible polymers exhibit the heterogeneity necessary to achieve the barrier properties that characterize the invention. When the particles are of too small a size or the blend is too well mixed, the compound will function as a homogenous composition with little oxygen barrier properties.

It is preferable that the input to extruder 12 be substantially uniformly blended, and that the output of extruder 12 be of substantially uniform composition. Substantial uniformity of composition is important in achieving a uniformity of properties. The barrier particles should be uniformly distributed—i.e., statistically homogeneously distributed—to achieve desired barrier properties. Extruder 12 should be a low-shear low-mixing extruder to avoid homogenization of the mixture in which the particles or domains of the discontinuous phase are too small.

Figure 3A:
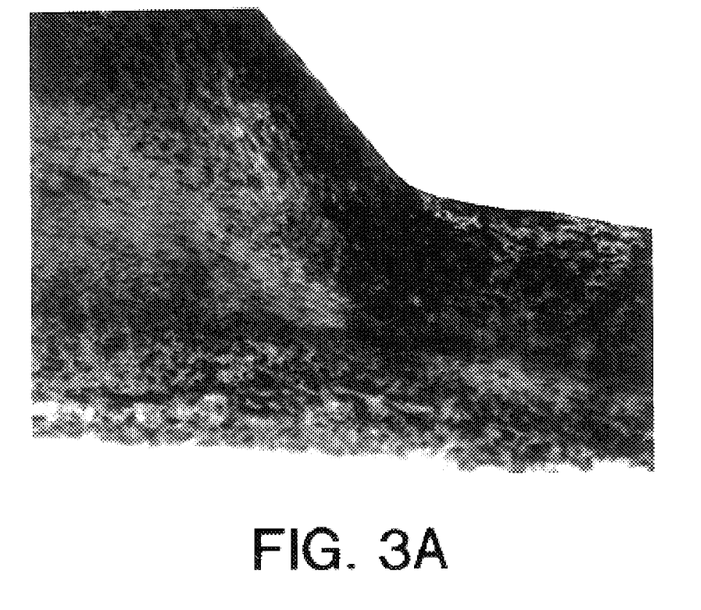
FIGS. 3A and 3B are photomicrographs at 50X of portions of the liner within the circles 3A and 3B in FIG. 2.
Figure 3B:
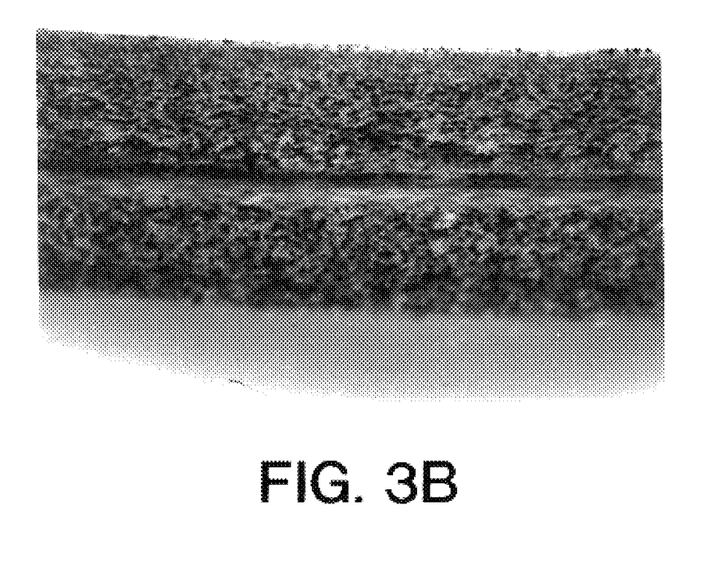
Figure 3C:
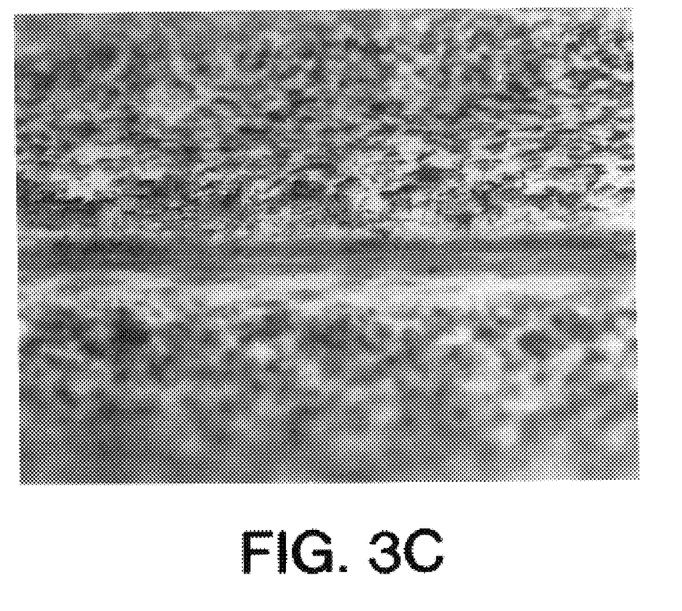
FIG. 3C is a photomicrograph at 100X of the portion of the liner illustrated in FIG. 3B.
Figure 4:
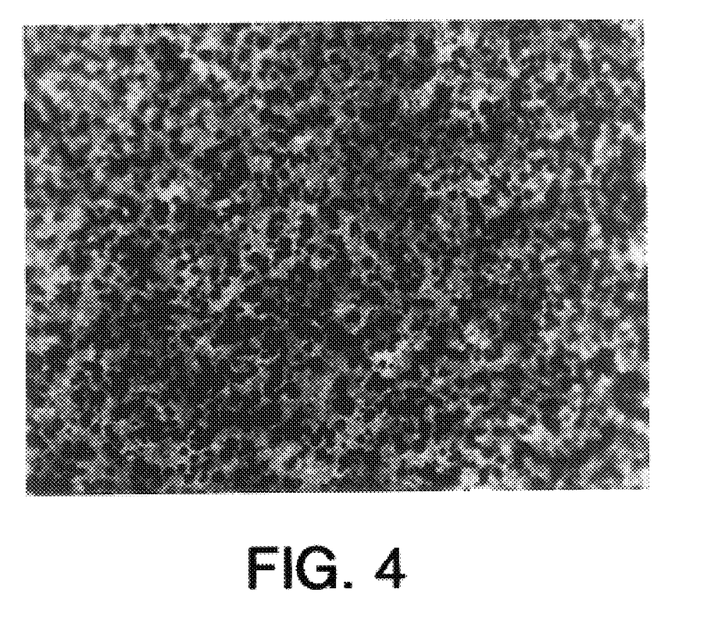
FIG. 4 is a photomicrograph at 100X of a charge pellet.
Figure 5A:
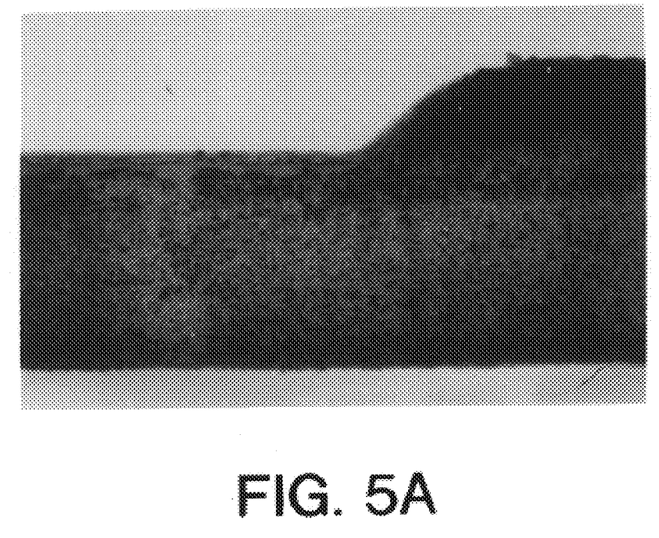
FIG. 5A is a photomicrograph at 50X of the edge portion of another embodiment of the invention.
Figure 5B:
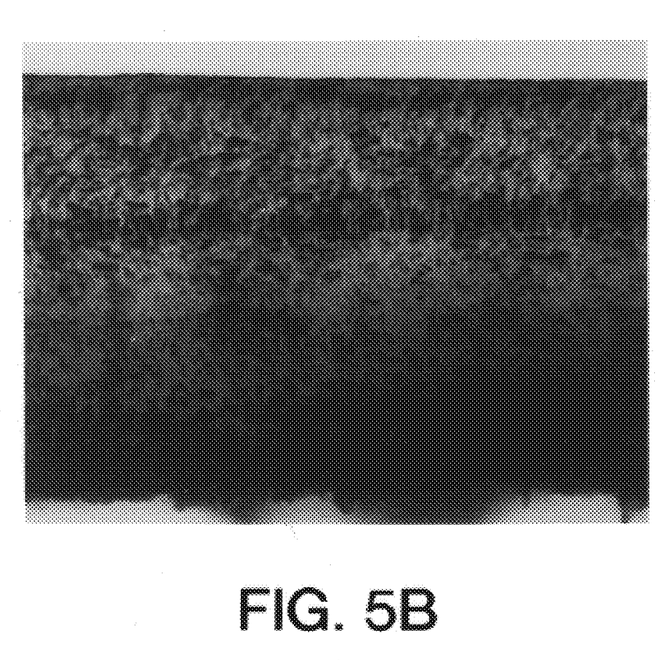
FIG. 5B is a photomicrograph at 100X of the center portion of the liner illustrated in FIG. 5A.

It has been found to be desirable that the barrier material not be too well blended into the matrix polymer. The barrier material should be in the form of discrete particles, essentially spheroidal, in the charge pellet, as illustrated in FIG. 4. If the barrier material is too well blended into the elastomer, there are no discrete particles in the elastomer matrix to form platelets during comparison molding. FIGS. 3A, 3B and 3C are photomicrographs of the center (FIGS. 3B and 3C) and edge (FIG. 3A) portions of liner 20a (FIG. 2) formed of a blend of 65% EVA, 34% EVOH and 1% compatibilizer (a maleic anhydride grafted polymer). The barrier material is essentially in the form of thin flat overlapping substantially two-dimensional platelets (dark in the micrographs) parallel to the plane of the liner. It is believed that the force of compression molding coupled with the radial material flow during compression molding, forms and aligns these platelets parallel to the plane of the liner disk. FIGS. 5A and 5B are similar photomicrographs of another liner compression molded from the same material blend.

Several sets of test samples were fabricated in the form of liners compression molded into closures. The test materials were extruded through the system of FIG. 1 at a melt temperature of 430 to 450° F. in proportions to yield the desired weight ratios. Pellets 20 were manually cut from the extrudate and placed in closure shells 22. With the pellets 20 still at or near melt temperature, the closure and pellet were placed in a compression mold as in FIG. 1, and the compression tool was activated to compress the pellet. The liner compression molding machine was that disclosed in above-noted U.S. Pat. No. 5,451,360. The liners were molded to the configuration of FIG. 2, with a thickness at position 3A of 0.025 to 0.028 inches, and a thickness at position 3B of 0.015 to 0.018 inches. All closures were 43 mm closures, and all liners had a diameter of 1,539 inches. The closures were conditioned for about two weeks at 100% relative humidity prior to further testing.

Each test closure with liner was then threaded onto a PET bottle finish at industry standard application torque (25 to 30 inch-pounds for a 43 mm closure). The finish was then cut from the bottle and epoxied onto a metal plate surrounding a hole coupled to a purge tube. The plate with closure was then placed in a Mocon OXYTRAN oxygen permeability tester. Oxygen outside of the closure was maintained at 1 atm, 23° C. and 100% relative humidity, and nitrogen gas was used to purge the volume within the closure to measure oxygen concentration, and therefore oxygen permeation through the closure. When oxygen permeability reach steady state, the figure was multiplied by 0.21 to correct for the quantity of oxygen in the atmosphere, and recorded.

When employing EVOH in polymer blends, it has generally been found in the past that the percentage reduction of gas transmission roughly corresponds to the percentage of EVOH in the blend. For example, a blend having 20% EVOH would typically be expected to exhibit a 20% reduction in oxygen transmission as compared with the same liner composition without EVOH. However, it was surprisingly discovered when implementing the present invention that the reduction in oxygen transmission rate far exceeds the percentage of EVOH in the test blends. For example, a polypropylene cap having an in-situ compression-molded barrier liner, in which the liner consists of a blend of 65% EVA, 34% EVOH and 1% adhesive/compatibilizer by weight, had an oxygen transmission rate of 0.006 to 0.007 cc/43 mm closure/day, as compared with a rate of 0.013 cc/43 mm closure/day for an identical closure having a compression molded EVA liner of the same thickness and tested under identical conditions. Another test was performed on closures with compression molded liners consisting of 79% EVA, 20% EVOH and 1% compatibilizer. These samples exhibited an oxygen transmission rate of 0.010 cc/43 mm closure/day, again as compared with a rate of 0.013 cc/43 mm closure/day for comparable EVA liners.

Other tests were performed on liners compression molded into a 43 mm diameter polypropylene closures having a liner diameter of 1.539 inches. These tests were performed at 100% relative humidity. All liners were 0.015 inches thick:

TABLE 1

| Test Sample | Oxygen Transmissivity (cc/43 mm closure/day) |
|---|---|
| (1) 100% EVA | 0.013 |
| (2) 79% EVA, 20% EVOH, 1% comp. | 0.010 |
| (3) 65% EVA, 34% EVOH, 1% comp. | 0.007 |
| (4) 65% EVA, 34% EVOH, 1% comp. | 0.010 |

The compatibilizer in samples (2) to (4) was the maleic anhydride grafted polymer previously noted. Test sample (4) was too well mixed, and thus did not exhibit the good results of sample (3). Sample hardnesses are illustrated by the following table:

TABLE 2

| Material | Hardness (Shore A) |
|---|---|
| 100% EVA | 91 |
| 75% EVA/25% EVOH | 92–94 |
| 50% EVA/50% EVOH | 94–96 |
| 25% EVA/75% EVOH | 97 |
| 100% EVOH | 100+ |

As noted above, the amount of barrier material that can be employed in the blend depends in part on the hardness of the matrix polymer. For example, the following table compares the hardnesses and ability to seal against a container mouth for various mixtures of EVOH with EVA (hardness equals 91 Shore A) and polypropylene/butyl rubber (TREFSIN, hardness equals 65 Shore A). The maleated polypropylene compatibilizer and lubricant were employed in the same amounts in all samples.

TABLE 3

| Material | Hardness (Shore A) | Functional Sealing |
|---|---|---|
| EVA + 20% EVOH | 92 | Yes |
| EVA + 34% EVOH | 92 | Yes |
| EVA + 50% EVOH | 94 | No |
| Polypropylene/butyl rubber + 20% EVOH | 67 | Yes |
| Polypropylene/butyl rubber + 34% EVOH | 75 | Yes |
| Polypropylene/butyl rubber + 50% EVOH | 81 | Yes |

The polypropylene/butyl rubber employed is marketed by Advanced Elastomer Systems under the trademark TREFSIN. Thus, a greater quantity of barrier material can be incorporated into a softer matrix material while maintaining the ability to function as a seal.

There have thus been disclosed as barrier liner, a closure with barrier liner, and a method of manufacturing the same, that fully satisfy the objectives and aims previously set forth. The liner is readily manufactured from otherwise conventional materials, and employing otherwise conventional techniques and equipment. The liner provides improved efficiency, in terms of the quantity of barrier material employed versus permeation and transmission of gasses such as oxygen and carbon dioxide, water vapor, and essential flavor oils (flavor scalping). Specific barrier material combinations have been disclosed. Other combinations are envisioned for different applications, and will suggest themselves to persons of ordinary skill in the art based upon the principles and parameters herein discussed.

All patents and/or publications cited above are incorporated herein by reference.

What is claimed is:

1. A plastic closure that comprises:
   a plastic cap having a base with a peripheral skirt defining a cap interior and means on said skirt for securing the closure to a container, and
   a liner compression molded in situ onto the interior of said base, said liner consisting essentially of a liner body of a matrix polymer containing a dispersion of discrete overlapping platelets of a barrier polymer material, said platelets being dispersed throughout said body and oriented essentially parallel to said base, said liner having a Shore A hardness not greater than 95.

2. The closure of claim 1 wherein said liner includes a compatibilizer comprising a thermoplastic resin to promote adhesion between the matrix polymer and the barrier platelets by reactive bonds or non-reactive adhesion mechanisms.

3. A plastic closure that comprises:
   a plastic cap having a base with a peripheral skirt defining a cap interior and means on said skirt for securing the closure to a container, and
   a liner compression molded in situ onto the interior of said base, said liner consisting essentially of a liner body of a matrix polymer containing a dispersion of discrete overlapping platelets of a barrier polymer material and, optionally, a compatibilizer comprising a thermoplastic resin to promote adhesion between the matrix polymer and the barrier platelets by reactive bonds or non-reactive adhesion mechanisms, said platelets being dispersed throughout said body and oriented essentially parallel to said base, said liner having a Shore A hardness not greater than 95.

4. The closure set forth in claim 2 or 3 wherein said matrix polymer is selected from the group consisting of thermoplastic elastomers, soft olefin polymers, and mixtures thereof.

5. The closure set forth in claim 4 wherein said matrix polymer is a thermoplastic elastomer having a Shore A hardness of 45 to 95 and a flexural modulus of 30,000 to 100,000 psi.

6. The closure set forth in claim 4 wherein said matrix polymer is a thermoplastic elastomer selected from the group consisting of styrene block copolymers and elastomeric alloys.

7. The closure set forth in claim 4 wherein said matrix polymer is selected from the group consisting of metallocene made polyethylene, ethylene-propylene rubbers, ethylene copolymers, and mixtures thereof.

8. The closure of claim 2 or 3 wherein said barrier material is selected from the group consisting of EVOH, nylon, acrylonitrile copolymers, blends of EVOH and amorphous nylon, blends of EVOH and an ionomer, acrylonitrile, cyclic olefin copolymers, and blends thereof.

9. The closure of claim 2 and 3 wherein said compatibilizer is selected from the group consisting of maleic anhydride grafted polymers, ethylene vinyl acetate grafted polymers, ethylene methyl acrylate, ionomers and blends thereof.

10. The closure set forth in claim 2 or 3 wherein said barrier material comprises EVOH and said matrix polymer comprises EVA or polypropylene/butyl rubber.

11. The closure set forth in claim 10 wherein the amount of said barrier material is in the range of about 20% to 60% by weight, said compatibilizer is in the range of about 1% to 10% by weight, with the balance consisting of said matrix polymer.

12. The closure set forth in claim 2 or 3 wherein said barrier material is in the range of about 20% to 60% by weight, said compatibilizer is in the range of about 1% to 10% by weight, with the balance consisting of said matrix polymer.

13. The closure set forth in claim 1 or 3 wherein said platelets are substantially uniformly distributed throughout said body.

14. The closure set forth in claim 1 or 3 wherein said liner contains lubricant in the amount of about 0.5% to 2.0% by weight.

15. The closure set forth in claim 14 wherein said lubricant is in the amount of about 1% by weight.

16. The closure set forth in claim 15 wherein said lubricant is selected from the group consisting of fatty acid amides, fatty acid esters, microcrystalline waxes, polyethylene glycols, primary amides, secondary amides, secondary-bis amides, and blends thereof.

* * * * *